(12) United States Patent
Connell, II et al.

(10) Patent No.: US 9,412,110 B2
(45) Date of Patent: Aug. 9, 2016

(54) MOBILE IMAGE ACQUISITION

(71) Applicant: GLOBALFOUNDRIES INC., Grand Cayman (KY)

(72) Inventors: Jonathan H. Connell, II, Cortlandt-Manor, NY (US); Sharathchandra U. Pankanti, Darien, CT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 221 days.

(21) Appl. No.: 14/078,060

(22) Filed: Nov. 12, 2013

(65) Prior Publication Data

US 2015/0131849 A1  May 14, 2015

(51) Int. Cl.
*G06K 9/00* (2006.01)
*G06Q 30/00* (2012.01)

(52) U.S. Cl.
CPC .......... *G06Q 30/018* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 7,693,757 B2 * | 4/2010 | Zimmerman | 705/28 |
| 7,864,302 B2 | 1/2011 | Pook et al. | |
| 8,996,165 B2 * | 3/2015 | Wang et al. | 700/245 |
| 2004/0144577 A1 | 7/2004 | Anderson | |
| 2006/0052676 A1 * | 3/2006 | Wang et al. | 600/300 |
| 2007/0199108 A1 | 8/2007 | Angle et al. | |
| 2008/0184375 A1 | 7/2008 | Nonaka et al. | |
| 2008/0262669 A1 | 10/2008 | Smid et al. | |
| 2011/0288417 A1 * | 11/2011 | Pinter et al. | 600/473 |

* cited by examiner

*Primary Examiner* — Shefali Goradia
(74) *Attorney, Agent, or Firm* — Scully Scott Murphy and Presser

(57) ABSTRACT

A set of conditions associated with monitoring a given environment is received. One or more locations in the given environment are determined, based on at least a portion of the received set of conditions, for which data is to be acquired. The given environment is traversed through the one or more locations. Data at the one or more locations is acquired. The acquired data is stored for subsequent review. One or more of the above steps are performed under control of a processing device at least a part of which is mounted on a mobile platform that is configured to move through the given environment. Determination of the one or more locations in the given environment may further include determining an extended region to be observed.

22 Claims, 5 Drawing Sheets

MOBILE IMAGE ACQUISITION

FIELD

The present application relates to image acquisition and, more particularly, to mobile image acquisition.

BACKGROUND

Inspection or monitoring of an environment for safety, security and other purposes is known to be important in domestic, commercial and other settings, and has been addressed in a variety of ways.

For example, fixed sensors can be placed within an environment to measure specific stimuli (e.g., temperature). However, many such sensors can only evaluate conditions in the immediate area around the sensor itself. For instance, the temperature twenty feet away from a thermocouple may be quite different from what the sensor is reading.

Fixed cameras are found in many environments and, unlike simpler sensors, they can detect non-proximate conditions. Unfortunately, they often cannot necessarily view the relevant areas in sufficient detail (or at all). For instance, a camera which looks along an aisle in a store does not generally have enough spatial resolution to identify a person's face at the far end of the aisle. Moreover, even if the camera is able to zoom in on this area, when the person is moving away from the camera, their face is likely not visible from this angle.

Human inspectors can move around in the environment and obtain necessary vantage points, for example, by bending over or looking behind objects. However, humans fatigue quickly and cannot maintain a high level of vigilance for extended intervals of time. Also, obtaining additional human inspectors can require a lengthy period of training for each additional inspector. Further, humans are susceptible to collusion and, for one reason or another, may not truthfully report the conditions present in an environment.

SUMMARY

Embodiments of the invention provide techniques for mobile image acquisition.

For example, in one embodiment, a method comprises the following steps. A set of conditions associated with monitoring a given environment is received. One or more locations in the given environment for which data is to be acquired are determined, based on at least a portion of the received set of conditions. The given environment is traversed through the one or more locations. Data at the one or more locations is acquired. The acquired data is stored for subsequent review. One or more of the above steps are performed under control of a processing device at least a part of which is mounted on a mobile platform that is configured to move through the given environment. Determination of the one or more locations in the given environment may further comprise determining an extended region to be observed.

In yet another embodiment, a computer program product is provided which comprises a processor-readable storage medium having encoded therein executable code of one or more software programs. The one or more software programs when executed by one or more processing devices implement steps of the above-described method.

In a further embodiment, an apparatus comprises a memory and a processor operatively coupled to the memory and configured to perform steps of the above-described method.

These and other objects, features, and advantages of the present invention will become apparent from the following detailed description of illustrative embodiments thereof, which is to be read in connection with the accompanying drawings.

DETAILED DESCRIPTION

Figure 1:
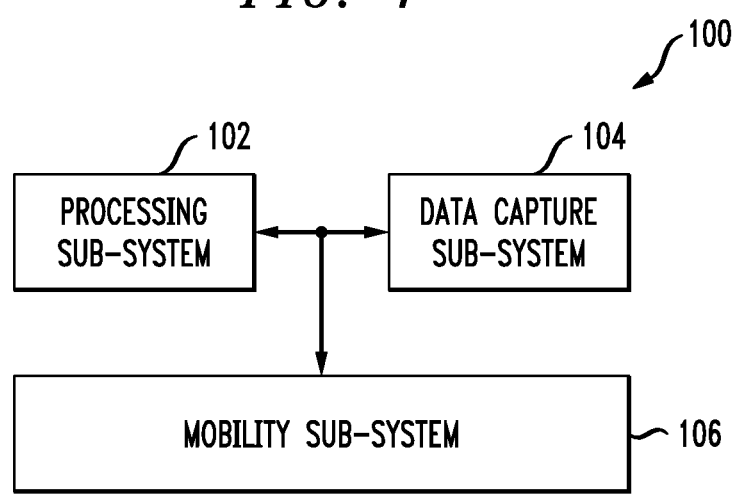
FIG. 1 illustrates a mobile image acquisition system according to an embodiment of the invention.

Embodiments of the present invention will be described herein with reference to exemplary computing systems including operatively coupled processing devices such as, but not limited to, one or more servers and one or more client devices (clients). It is to be appreciated, however, that embodiments of the invention are not restricted to use with the particular illustrative system and device configurations shown. Moreover, the phrase "computing system" as used herein with respect to various embodiments is intended to be broadly construed, so as to encompass, for example, private or public cloud computing systems, or parts thereof. However, a given embodiment may more generally comprise any arrangement of processing devices.

Illustrative embodiments of invention provide a mobile system used to acquire images of certain portions of an environment. The mobile platform provided by the system is automatically positioned so as to best view the area(s) of concern relevant to evaluating one or more health, safety, or operational conditions.

There are many applications that could benefit from such a system. For instance, ensuring an adequate width for passageways is an issue in stores (e.g., for shopping cart traversal), in warehouses (e.g., for forklifts and stack safety), and in outdoor public spaces (e.g., for wheelchairs on sidewalks). There is often no single vantage point from which such conditions can be evaluated, nor even a small enough set of locations to be economically viable. Other applications include looking for spills on tiled areas of a store (e.g., a slip and fall hazard), checking for vermin in a kitchen (e.g., a health certification issue), or verifying that fire doors have not been propped open (e.g., a safety issue). A self-directed mobile imaging platform according to embodiments of the invention could also be used for more effectively watching humans who are typically moving around and changing directions. The platform could check human compliance with specified work practices (e.g., washing hands before handling produce) or monitor them to ensure that activities have been completed in a timely manner (e.g., elderly individuals taking their pills).

Illustrative embodiments of the invention provide a robotic mobile system equipped with a camera that roams around a subject environment. Based on a model of the environment and the condition(s) the system is deployed to check for, the system determines a set of positions (and the viewing angle at each position) that will allow it to see details pertinent to assessing the specified condition(s). The system then plans a route between the various positions such that they are all visited. When each location is reached, the system points its camera in the associated direction and acquires one or more images and/or one or more video clips of this portion of the environment. The tour of positions, or some variant of it, is then executed multiple times to provide sufficient temporal sampling of the condition(s) at all selected locations in the environment. Furthermore, the system automatically selects (in real-time and/or off-line) other positions and/or extended regions for subsequent observation based on data obtained via previous condition sampling. The phrase "extended region," as used herein, is intended to refer to an area of the subject environment that comprises two or more discrete locations or points from which data is obtainable.

Advantageously, using a camera allows non-proximate sensing in contrast to fixed sensors. Furthermore, the mobile platform allows for a more diverse selection of viewpoints than a fixed camera. Still further, unlike a human, the automated system can be easily and quickly replicated, does not lose accuracy over time, and is not inclined to falsifying reports.

FIG. 1 illustrates a mobile image acquisition system 100 according to an embodiment of the invention. As shown, the mobile image acquisition system 100 comprises three main sub-systems: a processing sub-system 102, a data capture sub-system 104, and a mobility sub-system 106. The sub-systems 102, 104, and 106 are operatively coupled to each other, as will be explained further below.

The processing sub-system 102 generally provides the processing and storage functions of the system 100. That is, the processing sub-system 102 comprises a computing system (such as will be illustratively described below in the context of FIG. 5) that performs various processing and storage functions as well as manages functionalities of the data capture system 104 and the mobility sub-system 106. One example of a methodology that is executed via the processing sub-system 102 will be described below in the context of FIG. 2.

The data capture sub-system 104 generally acquires data from the environment in which the system 100 is deployed. For instance, the data capture sub-system comprises one or more cameras for capturing images/videos, and equipment configured to position and to orient the one or more cameras in response to commands from the processing sub-system 102. The data capture sub-system 104 may alternatively or additionally comprise other data capture devices such as environmental sensors (e.g., temperature sensors, etc.) for acquiring data in the subject environment other than the images/videos captured by the one or more cameras.

The mobility sub-system 106 generally provides mobility functionality for the system 100. That is, the mobility sub-system 106, in one embodiment, comprises a vehicle that is configured to support and move the processing sub-system 102 and the data capture sub-system 104 through the subject environment. The mobility sub-system 106 receives commands from the processing sub-system 102 and, in response thereto, traverses one or more paths in the subject environment to get to one or more locations at which the data capture sub-system 104 is directed to obtain data (e.g., one or more images, one or more videos, and/or other environmental data). In one or more embodiments, the mobility sub-system 106 comprises wheels or mobile tracks that enable the system 100 to traverse one or more surfaces of the subject environment.

Figure 2:
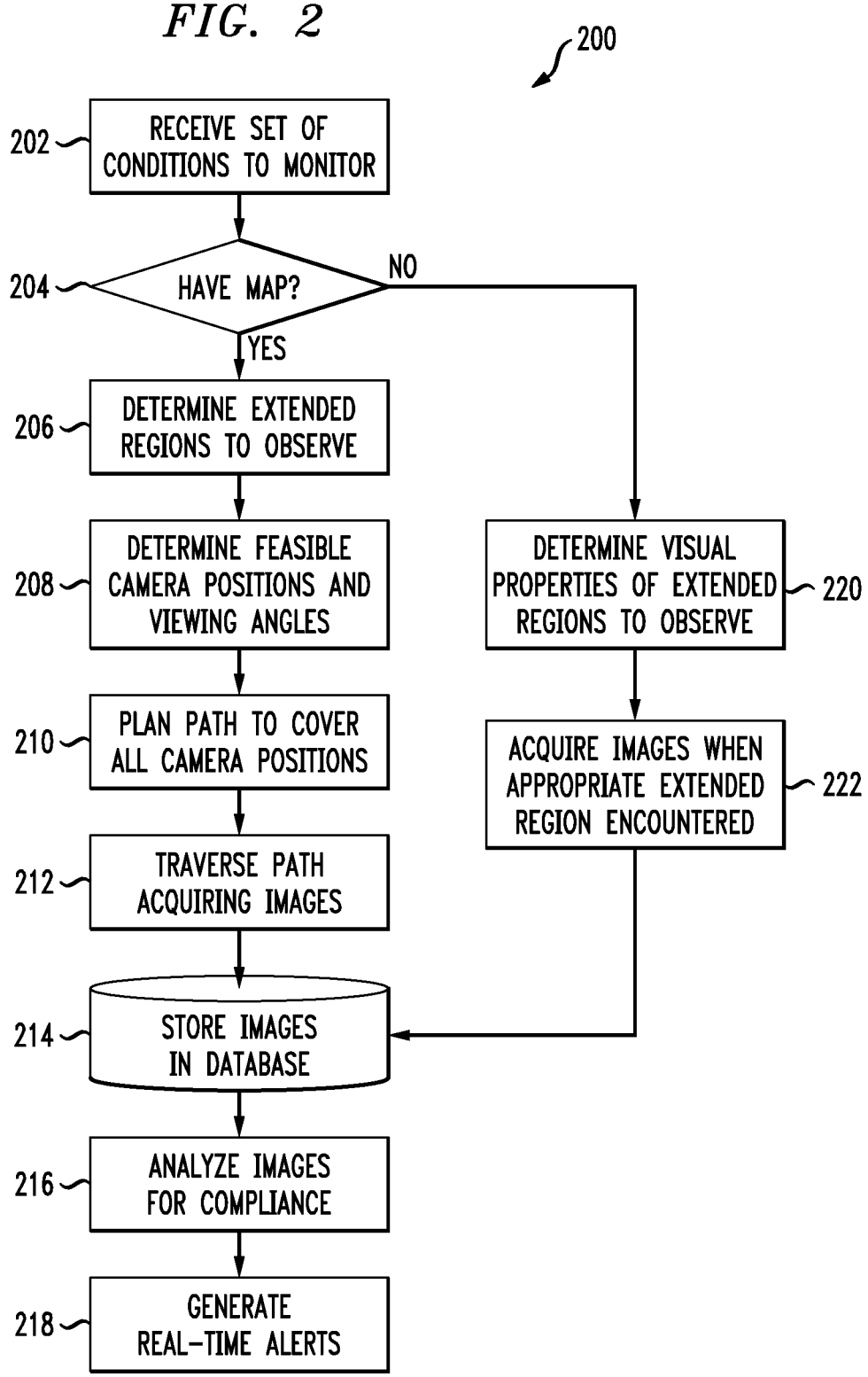
FIG. 2 illustrates a methodology for mobile image acquisition according to an embodiment of the invention.

It is to be appreciated that the system 100 may be implemented with conventional robotic technology such that part or all of the functions of the system 100 are performed automatically under control of one or more software programs. Alternatively or additionally, part or all of the functions of the system 100 may be remotely controlled by one or more other systems or one or more humans that are in communication with the system 100 via a wired and/or a wireless communication protocol. In one illustrative embodiment, the system 100 is equipped with a self-directed, robotically-controlled color camera on a pan and tilt stage. FIG. 2 illustrates a methodology 200 for mobile image acquisition according to an embodiment of the invention. As mentioned, the methodology 200 is executed via the processing sub-system 102 by providing corresponding commands to the data capture sub-system 104 and the mobility sub-system 106.

As shown, in step 202, the system 100 receives a set of conditions to be monitored in the subject environment. This set of conditions is dependent on the nature of the subject environment and what is being monitored in the environment (e.g., ensuring an adequate width for passageways in stores, warehouses and/or outdoor public spaces, looking for spills on tiled areas of a store, checking for vermin in a kitchen, or verifying that fire doors have not been propped open). The set of conditions can be provided by another system/human that is in communication with the system 100. The set of conditions can also be pre-stored on the processing sub-system 102. In one or more embodiments, the set of conditions can be input to the system 100 via speech. That is, the processing sub-system 102 comprises, in one or more embodiments, a speech recognition engine that is configured to decode input speech into instructions that represent the set of conditions.

In some cases, a map of the environment and objects in the environment is available to the system 100 beforehand, e.g., pre-stored by the processing sub-system 102. In other cases, the system 100 constructs such a map from the subject environment (e.g., the processing sub-system 102 generates a map from data already captured from the subject environment and/or data provided by another system/human). Thus, the methodology at step 204 determines whether or not a map is available. If yes, the system 100 determines an extended region (i.e., multiple locations) or extended regions to observe in step 206.

In step 208, the processing sub-system 102 determines feasible camera positions and viewing angles. That is, a set of poses (positions and orientations) is selected by the processing sub-system 102 based on the condition to be sensed, the traversability of the environment, and the location of pertinent objects. In step 210, a plan to cover all camera positions is computed. That is, the processing sub-system 102 determines one or more paths in the subject environment to get to the one or more locations of interest for data capture.

In step 212, the mobility sub-system 106 moves the system 100 through the selected path to each location (via direction from the processing sub-system 102). At each location in this extended region of interest, the data capture sub-system 104 is directed by the processing sub-system 102 to acquire one or more images of the environment to help assess the particular conditions that are being monitored. The images are stored, in step 214, in a database as evidence of compliance (or non-compliance). The captured data is analyzed for compliance (step 216) and, if necessary, one or more real-time alerts are generated (step 218). Analysis and alert generation are dependent on the nature of the inspection and monitoring being done. By way of example only, in a supermarket setting, a pre-stored image of the floor in a clean condition may be compared with an image taken in real-time during business hours. The two images preferably have the same or a similar vantage point. If an object or spill is present on the floor in the captured image that was not there in the pre-stored image, then an alert may be sent to supermarket personnel to investigate the object/spill and remedy the situation as needed.

Returning to step 204, if no map is available of the subject environment, in step 220, the processing sub-system 102 determines visual properties of the extended region or extended regions to be observed. For example, this means that the system 100 determines, ad-hoc, the course to traverse and the locations at which to capture data. In step 222, the system 100 captures images when the appropriate locations in the extended region are encountered. The captured images are then stored (step 214), analyzed (step 216), and may cause one or more alerts to be generated (step 218), as explained above.

Figure 3:
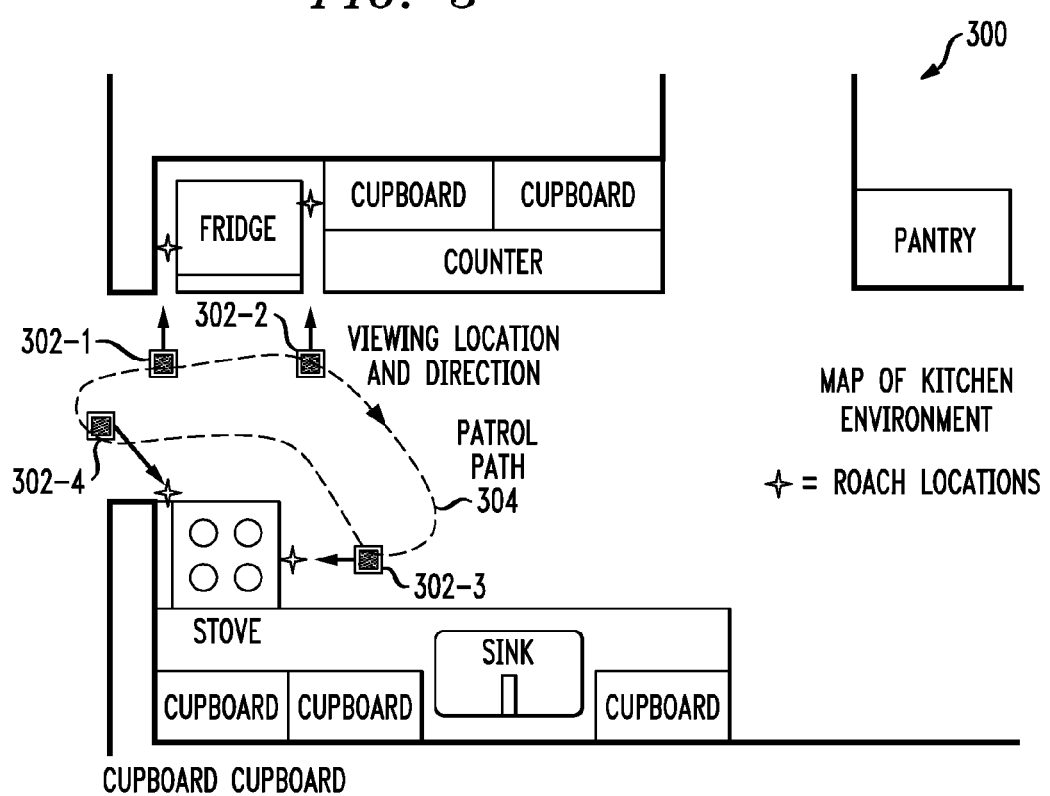
FIG. 3 illustrates an example of mobile image acquisition in a domestic environment according to an embodiment of the invention.

FIG. 3 illustrates an example 300 of mobile image acquisition in a domestic environment according to an embodiment of the invention. The example in FIG. 3 depicts a scenario where the system 100 is configured to inspect a kitchen for cockroaches. The system 100 finds the location of the refrigerator and the stove in the map. Then, since roaches are often under or behind such fixtures, the system 100 selects locations (302-1 and 302-2) on each side of the appliance so its camera is able to view and capture images in the space between the refrigerator and the wall and surrounding cabinetry. The system 100 may also select a location directly in front of the appliance with its camera angled downward to inspect under the appliance. Note that, although roaches are often found behind an appliance, in general, the traversability of the environment prohibits the system 100 from achieving any position that would give it a clear view behind the object. Thus, the selected locations (e.g., 302-1 through 302-4, as well as others not expressly shown) would then be connected in a patrol path 304, taking into account the layout of the kitchen, for the system 100 to iteratively visit at regular intervals.

So in operation, for example, the system 100 stops at one side of the refrigerator and acquires a short video in which cockroach motion should be visible, then it moves to the middle of the refrigerator looking down and acquires another video clip, and finally goes to the other edge of the refrigerator to collect yet another video. After this, the system 100 moves on to the stove and repeats the process. This visiting of locations and acquisition of video continues throughout the day (and night) to ensure that no cockroaches are ever detected. Of course, the system 100 is programmed to traverse its path avoiding people working in the space and any transitory obstructions (e.g., mop buckets) that may appear.

Furthermore, the system is configured to update the visited locations based on data acquired during at least a part of a traversal of the given environment. An example case is one where the robotic system observes ants in some scheduled inspection view, and then follows the trail of ants to their point of entry and adds this new location to its list of regions to monitor in the future.

Figure 4:
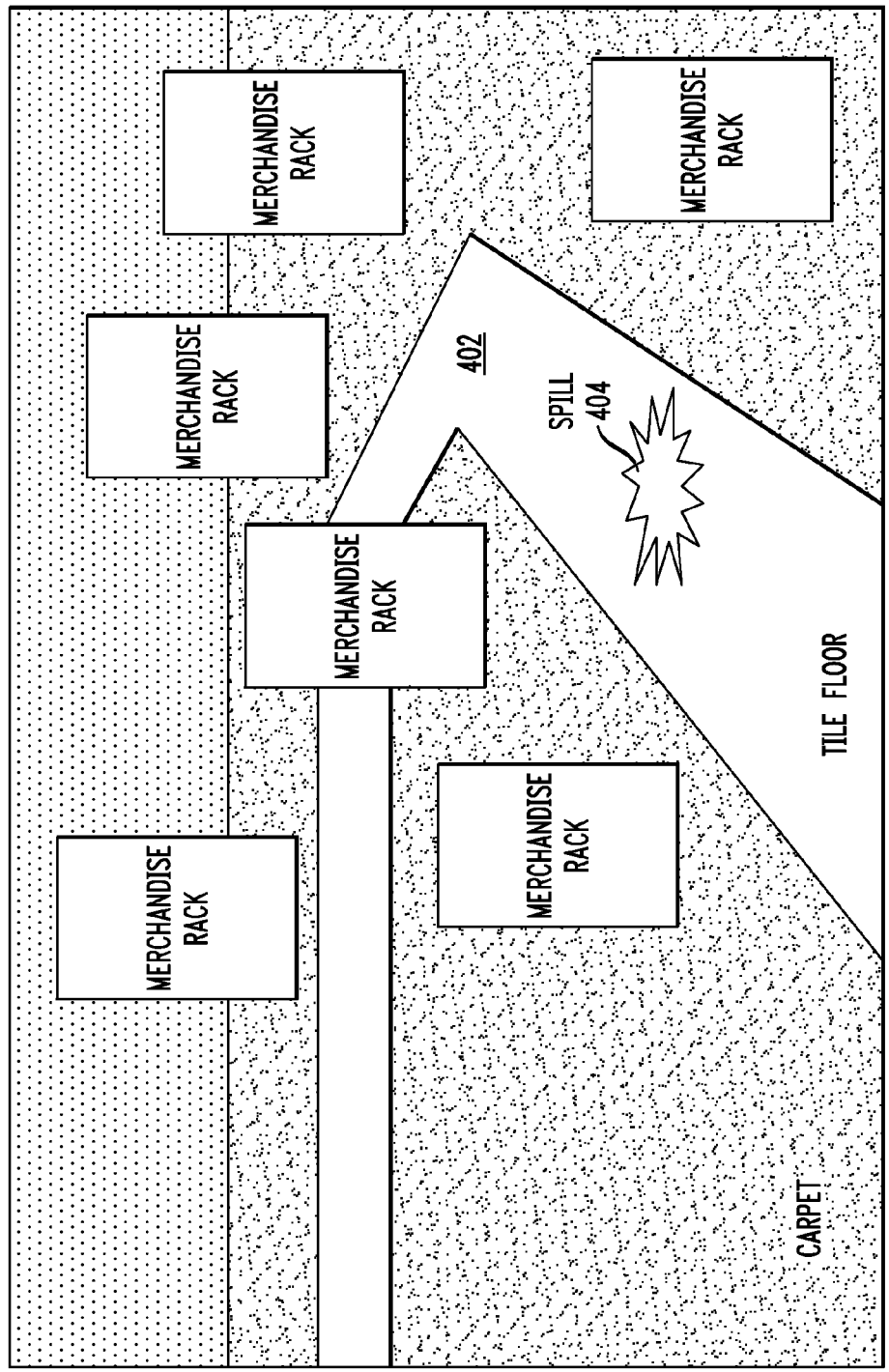
FIG. 4 illustrates an example of mobile image acquisition in a commercial environment according to an embodiment of the invention.

FIG. 4 illustrates an example 400 of mobile image acquisition in a commercial environment according to an embodiment of the invention. Recall as mentioned above that, in some cases, no explicit map is available (or perhaps not required) and no discrete set of positions is computed. Instead these items can be defined implicitly by the processing sub-system 102. For instance, assume the system 100 is programmed to look for spills on the tiled areas of a store. Generally, these regions can be differentiated from merchandise racks and adjacent carpeting on the basis of color and shape (e.g., eight foot wide white regions). For this environment, the system 100 can patrol randomly while remaining constrained to such tiled areas (a portion of the tiled areas or the entire tiled areas can be considered an extended region, as explained above). The job of the system 100 is then to inspect all portions of the tile surface 402 for puddles or spills 404 (e.g., using a polarization sensor). The system 100 can either record a continuous video stream for later analysis, or analyze the images in real time to generate spill alerts (and save selected images for forensic purposes).

As will be appreciated by one skilled in the art, embodiments of the invention may be embodied as a system, apparatus, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 4, the diagrams in the figures illustrate the architecture, functionality, and operation of possible implementations of systems, methods and computer program products according to various embodiments of the invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-4, can also include, as described herein, providing a system, wherein the system includes distinct modules (e.g., modules comprising software, hardware or software and hardware). These and other modules may be configured, for example, to perform the steps described and illustrated in the context of FIGS. 1-4.

Figure 5:
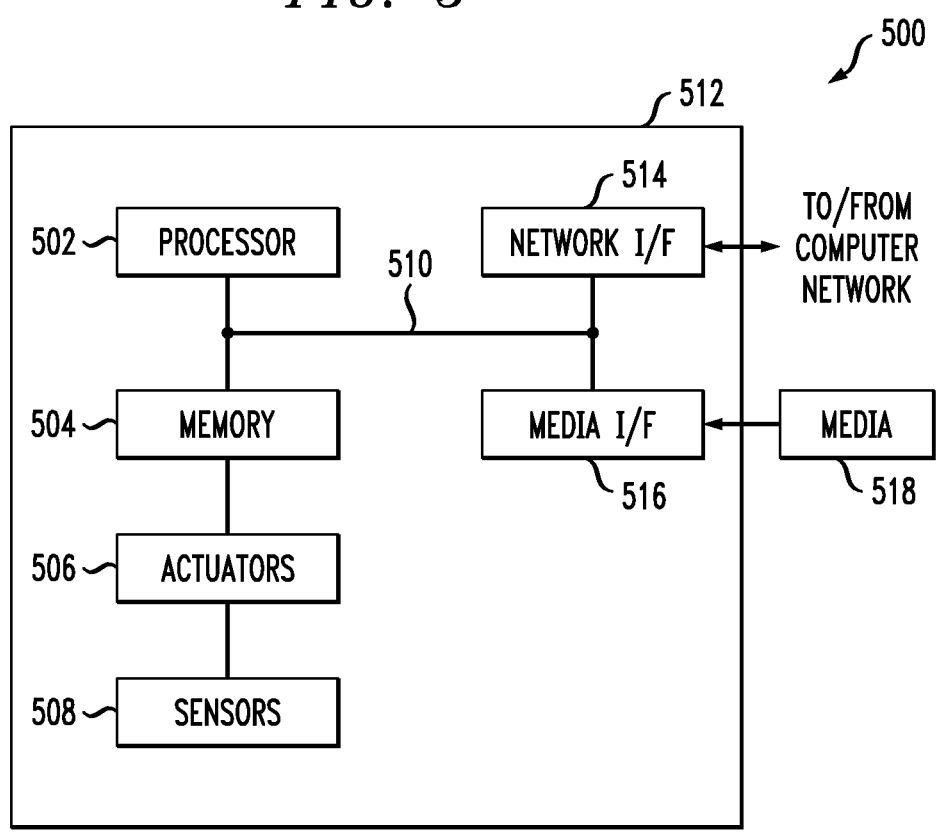
FIG. 5 illustrates a computing system in accordance with which one or more components/steps of modules/methodologies are implemented according to an embodiment of the invention.

One or more embodiments can make use of software running on a general purpose computer or workstation. With reference to FIG. 5, such an implementation 500 employs, for example, a processor 502, a memory 504, actuators 506 (an example of an output device such as a display, motors, robotics, etc.), and sensors 508 (an example of an input device such a keyboard, a camera, environmental monitoring device). The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output devices" as used herein, is intended to include (but not be limited to) one or more mechanisms for inputting data to the processing unit and one or more mechanisms for providing results associated with the processing unit.

The processor 502, memory 504, and actuators/sensors 506/508 can be interconnected, for example, via bus 510 as part of a data processing unit 512. Suitable interconnections, for example, via bus 510, can also be provided to a network interface 514, such as a network card, which can be provided to interface with a computer network, and to a media interface 516, such as a diskette or CD-ROM drive, which can be provided to interface with media 518.

A data processing system suitable for storing and/or executing program code can include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Actuators/sensors (examples of input/output (I/O) devices) 506/508 can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

Accordingly, it is to be understood that the computer architecture 500 shown in FIG. 5 may represent one illustrative physical implementation of the processing sub-system 102. Parts of the data capture sub-system 104 and/or the mobility sub-system 106 may also have an architecture that is the same or similar to computer architecture 500. Also, it is to be understood that all processing and storage functionality provided by the system 100 does not necessarily have to reside on the mobile platform provided by the mobility sub-system 106. That is, part of the processing and/or storage functionality provided by the system 100 may be provided by a computer architecture (e.g., the same as or similar to that which is illustrated in FIG. 5) that is remote from, but in communication with, the mobility sub-system 106. For example, multiple processing devices could be configured in a client/server arrangement.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   receiving a set of conditions associated with monitoring a given environment;
   determining, based on at least a portion of the received set of conditions, one or more locations in the given environment for which data is to be acquired and one or more viewing angles for which the data is to be acquired, wherein the data to be acquired comprises at least one of an image and a video;
   traversing the given environment through the one or more locations;
   acquiring data at the one or more locations; and
   storing the acquired data for subsequent review;
   wherein one or more of the above steps are performed under control of a processing device at least a part of which is mounted on a mobile platform that is configured to move through the given environment;
   wherein the traversing the given environment through the one or more locations further comprises the processing device instructing the mobile platform regarding a path to traverse so as to reach the one or more determined locations; and
   wherein the traversing the given environment through the one or more locations further comprises the processing device instructing the mobile platform to repeat at least part of the path that has already been traversed.

2. The method of claim 1, further comprising the step of analyzing at least a portion of the stored data for compliance with the set of conditions.

3. The method of claim 2, further comprising the step of generating one or more alerts as a result of the analysis step.

4. The method of claim 1, wherein the set of conditions comprises at least one of one or more safety conditions, one or more security conditions, and one or more health conditions.

5. The method of claim 1, wherein the step of receiving a set of conditions associated with monitoring a given environment further comprises receiving the set of conditions via input speech.

6. The method of claim 1, wherein the step of determining one or more locations in the given environment, based on at least a portion of the received set of conditions, for which data is to be acquired further comprises determining an extended region to be observed, the extended region comprising an area of the given environment that comprises two or more discrete locations or points from which data is obtainable.

7. The method of claim 6, wherein locations for the extended region to be observed are determined from a pre-stored map of the given environment.

8. The method of claim 6, wherein locations for the extended region to be observed are determined from one or more visual properties of the given environment.

9. The method of claim 6, wherein the step of determining one or more locations in the given environment, based on at least a portion of the received set of conditions, for which data is to be acquired further comprises updating the one or more locations based on data acquired during at least a part of a traversal of the given environment.

10. The method of claim 1, wherein the step of acquiring data at the one or more locations further comprises acquiring the at least one of an image and a video at the one or more locations via at least one camera.

11. The method of claim 10, wherein the step of acquiring the at least one of an image and a video at the one or more locations via at least one camera further comprises determining one or more feasible camera positions and viewing angles prior to acquiring the image or the video.

12. The method of claim 11, wherein the step of acquiring the at least one of an image and a video at the one or more locations via at least one camera further comprises directing the camera to the one or more feasible camera positions and viewing angles prior to acquiring the image or the video.

13. A computer program product comprising a non-transitory processor-readable storage medium having encoded therein executable code of one or more software programs, wherein the one or more software programs when executed by the one or more processing devices implement steps of:
   receiving a set of conditions associated with monitoring a given environment;
   determining, based on at least a portion of the received set of conditions, one or more locations in the given environment for which data is to be acquired and one or more viewing angles for which the data is to be acquired, wherein the data to be acquired comprises at least one of an image and a video;
   causing a traversal of the given environment through the one or more locations;
   acquiring data at the one or more locations; and
   storing the acquired data for subsequent review;
   wherein one or more of the above steps are performed under control of the one or more processing devices at least a part of which is mounted on a mobile platform that is configured to move through the given environment;
   wherein the traversal of the given environment through the one or more locations further comprises the one or more processing devices instructing the mobile platform regarding a path to traverse so as to reach the one or more determined locations; and
   wherein the traversal of the given environment through the one or more locations further comprises the one or more processing devices instructing the mobile platform to repeat at least part of the path that has already been traversed.

14. A system, comprising:
   a processing sub-system;
   a data capture sub-system; and
   a mobility sub-system configured to support and move the processing sub-system and the data capture sub-system through a given environment;
   wherein the processing sub-system comprises a memory and at least one processing device configured to:
     receive a set of conditions associated with monitoring a given environment;
     determine, based on at least a portion of the received set of conditions, one or more locations in the given environment for which data is to be acquired and one or more viewing angles for which the data is to be acquired, wherein the data to be acquired comprises at least one of an image and a video;
   cause a traversal of the given environment through the one or more locations via the mobility sub-system;
     acquire data at the one or more locations via the data capture sub-system; and
     store the acquired data for subsequent review;

wherein the traversal of the given environment through the one or more locations further comprises the at least one processing device instructing the mobility sub-system regarding a path to traverse so as to reach the one or more determined locations; and wherein the traversal of the given environment through the one or more locations further comprises the at least one processing device instructing the mobility sub-system to repeat at least part of the path that has already been traversed.

15. The system of claim 14, wherein the processing sub-system is further configured to analyze at least a portion of the stored data for compliance with the set of conditions.

16. The system of claim 15, wherein the processing sub-system is further configured to generate one or more alerts as a result of the analysis step.

17. The system of claim 15, wherein receiving a set of conditions associated with monitoring a given environment further comprises receiving the set of conditions via input speech.

18. The system of claim 15, wherein determining one or more locations in the given environment, based on at least a portion of the received set of conditions, for which data is to be acquired further comprises determining locations for an extended region to be observed, the extended region comprising an area of the given environment that comprises two or more discrete locations or points from which data is obtainable.

19. The system of claim 18, wherein locations for the extended region to be observed are determined from a pre-stored map of the given environment.

20. The system of claim 18, wherein locations for the extended region to be observed are determined from one or more visual properties of the given environment.

21. The system of claim 14, wherein acquiring data at the one or more locations further comprises acquiring the at least one of an image and a video at the one or more locations via at least one camera of the data capture sub-system.

22. A mobile imaging system for assessing compliance in an environment, the mobile imaging system comprising:

a mobile platform configured to support and move a camera for acquiring at least one of an image and a video; and a database in which the acquired at least one of an image and a video are retained as evidence of compliance or lack thereof; and a processing sub-system with at least one processing device configured to:

receive a set of conditions associated with monitoring the environment;

determine, based on at least a portion of the received set of conditions, one or more locations in the environment for which data is to be acquired and one or more viewing angles for which the data is to be acquired, wherein the data to be acquired comprises the at least one of an image and a video;

cause a traversal of the environment through the one or more locations via the mobile platform;

acquire data at the one or more locations via the camera; and store the acquired data in the database;

wherein the traversal of the environment through the one or more locations further comprises the at least one processing device instructing the mobile platform regarding a path to traverse so as to reach the one or more determined locations; and wherein the traversal of the environment through the one or more locations further comprises the at least one processing device instructing the mobile platform to repeat at least part of the path that has already been traversed.

* * * * *